(12) United States Patent
Kim et al.

(10) Patent No.: US 11,382,199 B2
(45) Date of Patent: Jul. 5, 2022

(54) WIRELESS CONTROL APPARATUS AND METHOD FOR HAPTIC DEVICE

(71) Applicant: CK MATERIALS LAB CO., LTD., Seoul (KR)

(72) Inventors: Hyeong Jun Kim, Seoul (KR); Jong Hun Lee, Seoul (KR); Ki Suk Son, Seoul (KR)

(73) Assignee: CK MATERIALS LAB CO., LTD., Seoul (KR)

( * ) Notice: Subject to any disclaimer, the term of this patent is extended or adjusted under 35 U.S.C. 154(b) by 0 days.

(21) Appl. No.: 16/613,860

(22) PCT Filed: Oct. 12, 2017

(86) PCT No.: PCT/KR2017/011226
§ 371 (c)(1),
(2) Date: Mar. 25, 2020

(87) PCT Pub. No.: WO2019/054549
PCT Pub. Date: Mar. 21, 2019

(65) Prior Publication Data
US 2020/0225751 A1    Jul. 16, 2020

(30) Foreign Application Priority Data
Sep. 18, 2017 (KR) .................. 10-2017-0119612

(51) Int. Cl.
*H04B 3/36* (2006.01)
*H05B 47/10* (2020.01)
*G06F 3/01* (2006.01)

(52) U.S. Cl.
CPC ............. *H05B 47/10* (2020.01); *G06F 3/016* (2013.01)

(58) Field of Classification Search
CPC .......... G06F 3/016; G06F 4/016; H05B 47/10
See application file for complete search history.

(56) References Cited

U.S. PATENT DOCUMENTS

| 2011/0063208 A1* | 3/2011 | Van Den Eerenbeemd ................ G06F 3/011 345/156 |
| 2012/0032906 A1* | 2/2012 | Lemmens ............... G06F 3/016 345/173 |
| 2014/0210758 A1* | 7/2014 | Park ...................... G06F 3/0488 345/173 |

(Continued)

FOREIGN PATENT DOCUMENTS

| KR | 10-2010-0068590 A | 6/2010 |
| KR | 1020100112129 A | 10/2010 |

(Continued)

*Primary Examiner* — Julie B Lieu
(74) *Attorney, Agent, or Firm* — Hyunho Park; Greenberg Traurig, LLP

(57) ABSTRACT

A control apparatus and method for controlling a haptic device are disclosed. The control apparatus can comprise: a haptic pattern data generation unit for generating first haptic pattern data corresponding to a bit pattern of content; a wireless data generation unit for generating wireless data including the first haptic pattern data and identification data of at least one target haptic device by which the first haptic pattern data is to be received; and a wireless data transmission unit for transmitting the generated wireless data through an antenna.

18 Claims, 9 Drawing Sheets

(56) References Cited

U.S. PATENT DOCUMENTS

| | | | |
|---|---|---|---|
| 2014/0333564 A1* | 11/2014 | Hong | H04W 4/21 |
| | | | 345/173 |
| 2018/0049287 A1* | 2/2018 | Lu | H04L 41/08 |
| 2020/0241643 A1* | 7/2020 | Kim | G08B 6/00 |
| 2021/0083892 A1* | 3/2021 | Campbell | H04L 12/2803 |
| 2021/0257867 A1* | 8/2021 | Park | H02J 50/80 |

FOREIGN PATENT DOCUMENTS

| | | |
|---|---|---|
| KR | 10-2011-0109363 | 10/2011 |
| KR | 10-2014-0092837 A | 7/2014 |
| KR | 10-2014-0097902 A | 8/2014 |
| KR | 10-2014-0138086 A | 12/2014 |
| KR | 10-2014-0138347 A | 12/2014 |
| KR | 10-2015-0119493 A | 10/2015 |
| KR | 1020160012704 A | 2/2016 |
| KR | 1020160146551 A | 12/2016 |
| KR | 1020170015122 A | 2/2017 |
| KR | 1020170101236 A | 9/2017 |

* cited by examiner

WIRELESS CONTROL APPARATUS AND METHOD FOR HAPTIC DEVICE

TECHNICAL FIELD

The following description relates to a method and apparatus for controlling an operation of a haptic device.

BACKGROUND ART

As the integration of touch screen technology into smart devices is becoming more common, the utilization of mechanical buttons is gradually decreasing. However, consumers accustomed to typical mechanical buttons have a desire to experience a touch of the mechanical button even on smart devices. To satisfy such desire of consumers, a haptic device may provide an appropriate haptic feedback to a user to provide a touch feeling that can be felt in a typical mechanical button. The haptic device not only provides a touch feeling on a user interface, but also provides a suitable haptic feedback in context to audiences participating in various performances and sports events. Through this, the haptic device may provide the audiences with a higher level of immersion for the performances and sports events.

Meanwhile, there has been provided technology for providing immersion to the audiences through a stage lighting wirelessly controlled in a performance or sports event. However, according to haptic technology, it is possible to provide a suitable haptic stimulus corresponding to an event situation of a performance and a sports game, thereby a much higher level of immersion to audiences. Also, the haptic technology enables visually- or hearing-impaired users to enjoy the performance and sports game through the haptic stimulus.

DISCLOSURE OF INVENTION

Technical Solutions

According to an aspect, there is provided a control apparatus for controlling an operation of a haptic device, the apparatus including a haptic pattern data generator configured to generate first haptic pattern data corresponding to a bit pattern of content, a wireless data generator configured to generate wireless data including the first haptic pattern data and identification data of at least one target haptic device to receive the first haptic pattern data, and a wireless data transmitter configured to transmit the generated wireless data through an antenna.

The control apparatus may further include a haptic pattern data storage configured to store at least one of first haptic pattern data previously generated based on the bit pattern of the content and a second haptic pattern data previously generated based on a predetermined bit pattern for implementing an event effect.

The wireless data generator may be configured to generate wireless data including the second haptic pattern data and identification data of at least one haptic device to receive the second haptic pattern data.

The wireless data generator may be configured to generate wireless data including a haptic pattern data indicator for selecting at least one haptic pattern data from first haptic pattern data and second haptic pattern data stored in the haptic device.

The wireless data may further include operation control data associated with an operation of the at least one haptic device.

The control apparatus may further include a lighting pattern data generator configured to generate lighting pattern data for the at least one haptic device. The wireless data may further include the lighting pattern data.

The lighting pattern data generator may be configured to determine a lighting pattern to be applied to the at least one haptic device based on stage lighting data and generate the lighting pattern data based on the determined lighting pattern.

According to another aspect, there is also provided a haptic device including a wireless data receiver configured to receive wireless data from a control apparatus, a pattern data extractor configured to extract haptic pattern data from the wireless data, an actuator configured to generate a haptic stimulus, and an actuator controller configured to generate a control signal for controlling the actuator based on the extracted haptic pattern data.

The haptic pattern data may include at least one of first haptic pattern data corresponding to a bit pattern of content and second haptic pattern data corresponding to a predetermined bit pattern for implementing an event effect.

The haptic device may further include a haptic pattern data storage configured to store at least one of first haptic pattern data previously generated based on a bit pattern of content and second haptic pattern data previously generated based on a predetermined bit pattern for implementing an event effect.

According to another aspect, there is also provided a wireless data providing method performed by a control apparatus to control an operation of a haptic device, the method including generating first haptic pattern data corresponding to a bit pattern of content, generating wireless data including the first haptic pattern data and identification data of at least one target haptic device to receive the first haptic pattern data, and transmitting the generated wireless data through an antenna.

The wireless data providing method may further include storing, in a haptic pattern data storage, second haptic pattern data corresponding to a predetermined bit pattern for implementing an event effect, and generating wireless data including the second haptic pattern data and identification data of at least one target haptic device to receive the second haptic pattern data.

BEST MODE FOR CARRYING OUT THE INVENTION

Figure 1:
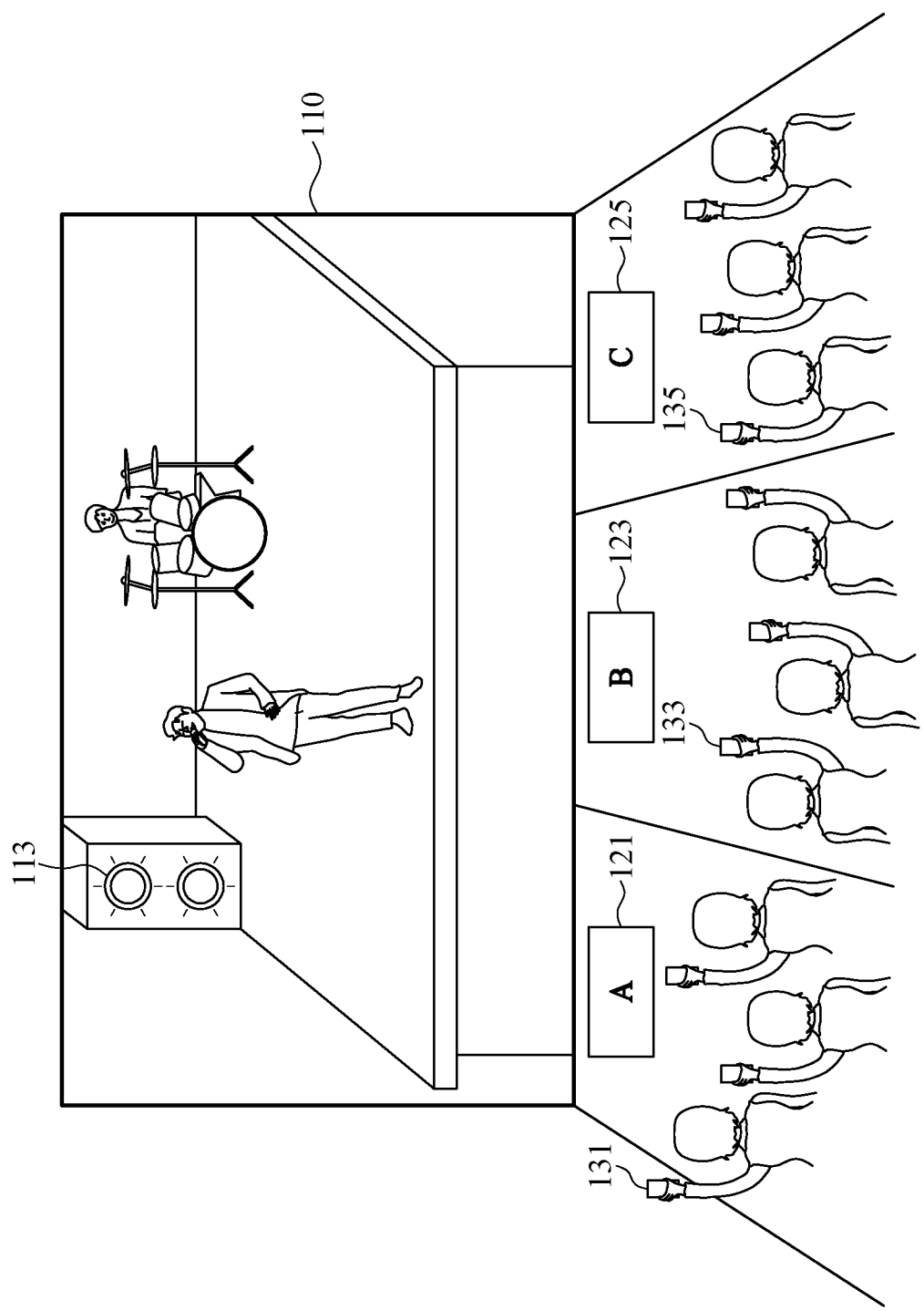
FIG. 1 is a diagram illustrating an example of a wireless control system for a haptic device according to an example embodiment.

Reference will now be made in detail to embodiments of the present disclosure, examples of which are illustrated in the accompanying drawings. It should be understood, however, that there is no intent to limit this disclosure to the particular example embodiments disclosed. On the contrary, example embodiments are to cover all modifications, equivalents, and alternatives falling within the scope of the example embodiments.

Although terms of "first," "second," and the like are used to explain various components, the components are not limited to such terms. These terms are used only to distinguish one component from another component. For example, a first component may be referred to as a second component, or similarly, the second component may be referred to as the first component within the scope of the present disclosure.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined herein, all terms used herein including technical or scientific terms have the same meanings as those generally understood by one of ordinary skill in the art. Terms defined in dictionaries generally used should be construed to have meanings matching contextual meanings in the related art and are not to be construed as an ideal or excessively formal meaning unless otherwise defined herein.

When an embodiment is otherwise implemented, a function or operation specified in a specific block may be performed differently from the flowchart. For example, two consecutive blocks may actually be executed substantially simultaneously, or the blocks may be reversed according to related functions or operations.

Hereinafter, example embodiments will be described in detail with reference to the accompanying drawings. Regarding the reference numerals assigned to the elements in the drawings, it should be noted that the same elements will be designated by the same reference numerals. Also, in the description of example embodiments, detailed description of well-known related structures or functions will be omitted.

FIG. 1 is a diagram illustrating an example of a wireless control system for a haptic device according to an example embodiment.

The wireless control system for the haptic device may provide a haptic stimulus and a lighting effect corresponding to content provided to consumers of the content using the haptic device, thereby providing a higher level of immersion. Content 110 provided to content consumers may be a concert performance of a singer, a sports game, or the like, but is not limited thereto. Referring to FIG. 1, while the content 110 such as a concert performance is provided, the content consumers may experience a higher level of immersion into the content 110 along with a haptic stimulus and/or lighting effect provided through haptic devices 131, 133, and 135. The haptic devices 131, 133, and 135 may provide a specific haptic stimulus and/or lighting effect to the content consumers.

The haptic devices 131, 133, and 135 may provide a predetermined pattern of haptic stimulus to users based on haptic pattern data corresponding to an audio signal of provided content data. As an example, during the concert performance, the haptic devices 131, 133, and 135 may provide a haptic stimulus corresponding to a bit pattern of a song to the users. As another example, when the haptic devices 131, 133, and 135 are used in a baseball game, the haptic devices 131, 133, and 135 may provide a haptic stimulus corresponding to a sound made by a batter hitting a ball to the users.

In another example embodiment, the haptic devices 131, 133, and 135 may provide a haptic stimulus to the users of the haptic devices 131, 133, and 135 based on haptic pattern data corresponding to a predetermined bit pattern for implementing an event effect. The event effect may include, for example, an effect corresponding to a specific gesture of a singer in the concert, a rain falling effect, an effect expressing a specific mood (e.g., enthusiastic mood, gloomy mood, etc.), and an effect expressing a heartbeat, but is not limited thereto. The haptic devices 131, 133, and 135 may provide, to the users, a predetermined haptic stimulus corresponding to a specific bit pattern for implementing the event effect.

In another example embodiment, the haptic devices 131, 133, and 135 may provide a lighting effect of a pattern determined based on stage lighting data of provided content to the users. For example, the stage lighting data may include lighting pattern data provided through a lighting device 113 used in a concert of a singer. In this example, the haptic devices 131, 133, and 135 may use built-in lighting devices to provide a lighting effect corresponding to the lighting pattern data of the stage lighting data to the users.

The haptic devices 131, 133, and 135 may be classified into user groups 121, 123, and 125 based on identification data thereof. The haptic devices 131, 133, and 135 may receive different haptic pattern data or lighting pattern data based on the user groups 121, 123, and 125 into which the haptic devices 131, 133, and 135 are classified. Based on the received haptic pattern data or lighting pattern data, the haptic devices 131, 133, and 135 may provide different patterns of haptic stimuli and/or lighting effects to the users.

The haptic devices 131, 133, and 135 may be classified into the user group A 121, the user group B 123, and the user group C 125 based on the identification data of the haptic devices. For example, haptic devices classified as the user group A 121 may provide red light and a haptic stimulus corresponding to a bit pattern of a base, to users of the user group A 121. Haptic devices classified as the user group B 123 may provide blue light and a haptic stimulus corresponding to a bit pattern of a drum, to users of the user group B 121. Haptic devices classified as the user group B 123 may provide green light and a haptic stimulus corresponding to a bit pattern of a melody, to users of the user group C 121.

Figure 2:
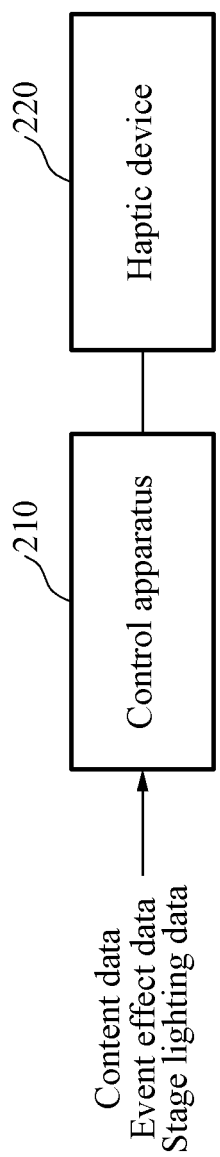
FIG. 2 is a diagram illustrating a configuration of a wireless control system for a haptic device according to an example embodiment.

FIG. 2 is a diagram illustrating a configuration of a wireless control system for a haptic device according to an example embodiment.

Referring to FIG. 2, a wireless control system for a haptic device may include a control apparatus 210 that receives input data and controls a haptic device based on the received input data, and a haptic device 220 that provides a haptic stimulus and a lighting effect to a user. The input data may include at least one of, for example, content data, event effect data, and stage lighting data. The content data may be data including content, for example, a performance event, a sports event, and the like to which the haptic device 220 is to be applied. A type of the content data is not limited to the aforementioned example. For example, the content data may include content provided in a predetermined event to which the haptic device 220 is to be applied. The content data may include an audio signal of provided content. The event effect data may include data indicating an event effect provided in the content. The stage lighting data may include data on a lighting pattern of an environment in which content is provided. When the haptic device 220 is applied to an on-stage performance, the control apparatus 210 may be installed in a vicinity of a stage to control haptic devices of audiences. An installation position of the control apparatus is not limited to the aforementioned example. In a case of a concert performance, the haptic device 220 may be provided in a form of a wearable device or a light stick to be worn by an audience, but not be limited thereto. Configurations and operations of the control apparatus 210 and the haptic device 220 will be described in detail with reference to the accompanying drawings. Hereinafter, the term "haptic pattern data" is used as a term including both first haptic pattern data and second haptic pattern data described below.

Figure 3:
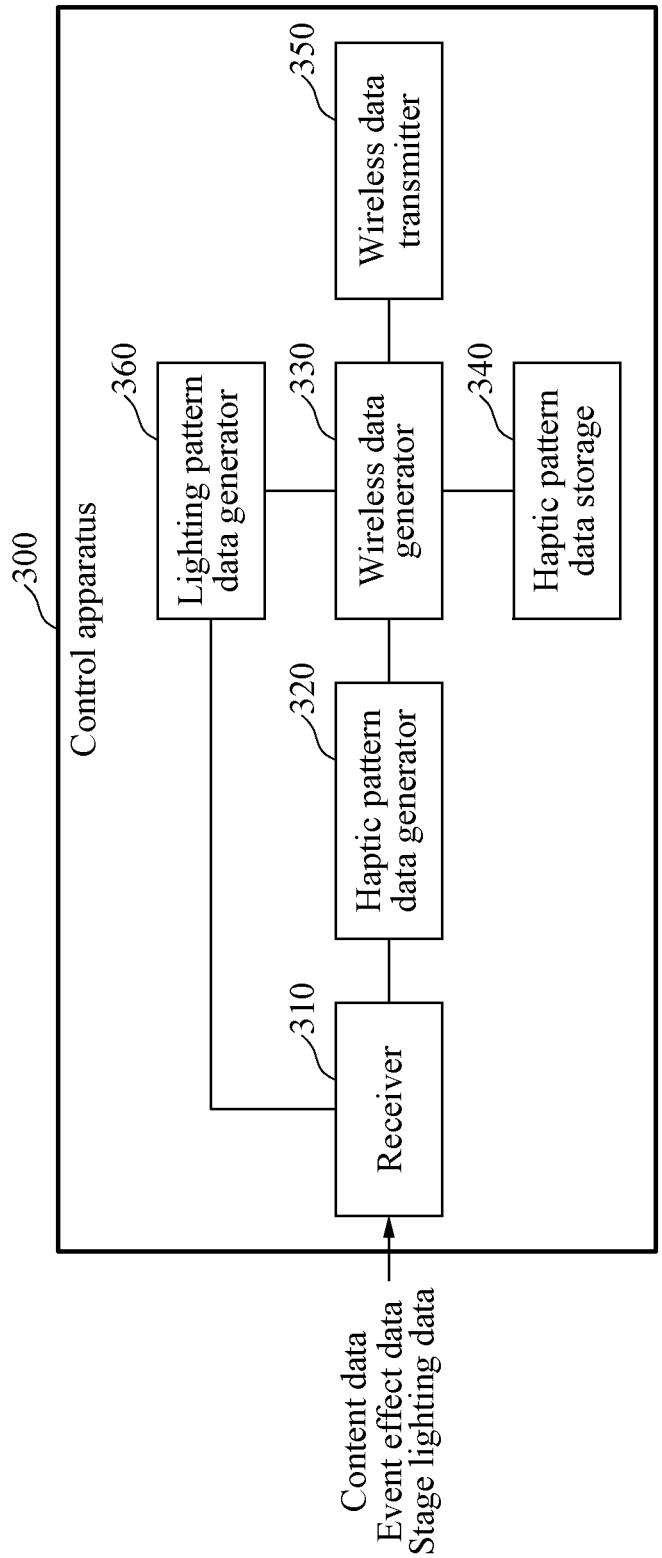
FIG. 3 is a diagram illustrating a configuration of a control apparatus according to an example embodiment.

FIG. 3 is a diagram illustrating a configuration of a control apparatus according to an example embodiment.

Referring to FIG. 3, a control apparatus 300 may include a receiver 310 that receives input data, a haptic pattern data generator 320 that generates haptic pattern data, a lighting pattern data generator 360 that generates lighting pattern data corresponding to a lighting pattern of a stage lighting, a wireless data generator 330 that generates wireless data to be transmitted to a haptic device, a haptic pattern data storage 340 in which haptic pattern data is stored, and a wireless data transmitter 350 that transmits the generated wireless data to the haptic device.

The receiver 310 may receive content data for generating haptic pattern data, event effect data, and stage lighting data for generating lighting pattern data. The haptic pattern data generator 320 may generate first haptic pattern data corresponding to a bit pattern of content. For example, the bit pattern of the content may be an audio bit pattern of an audio signal included in content data received through the receiver 310. The haptic pattern data generator 320 may extract the audio bit pattern from the audio signal included in the content data received through the receiver 310, and generate the first haptic pattern data corresponding to the extracted audio bit pattern. An operation of the haptic pattern data generator 320 extracting an audio bit pattern from an audio signal of content data will be described in detail with reference to FIGS. 4a, 4b, 5a, and 5b.

In another example embodiment, the haptic pattern data generator 320 may generate second haptic pattern data corresponding to a predetermined bit pattern for implementing an event effect. The event effect may include, for example, an effect corresponding to a specific gesture of a singer, a rain falling effect, an effect expressing a specific mood (e.g., enthusiastic mood, gloomy mood, etc.), and an effect expressing a heartbeat, but is not limited thereto. The haptic pattern data generator 320 may generate second haptic pattern data corresponding to a predetermined bit pattern for implementing an event effect indicated in event effect data received through the receiver 310. For example, when the event effect is an effect expressing an enthusiastic mood, the haptic pattern data generator 320 may generate second haptic pattern data of a fast and furious bit pattern representing the enthusiastic mood based on the corresponding event effect.

The haptic pattern data generator 320 may generate the first haptic pattern data distinguished for each group of haptic devices. The haptic pattern data generator 320 may generate the first haptic pattern data distinguished for each group of haptic devices even for the same content data. For example, the haptic pattern data generator 320 may generate the first haptic pattern data by classifying haptic pattern data corresponding to a bit pattern of a base and haptic pattern data corresponding to a bit pattern of a drum for each group of haptic devices based on content data on a concert performance received through the receiver 310. Also, the haptic pattern data generator 320 may generate the second haptic pattern data distinguished for each group of haptic devices.

The haptic pattern data storage 340 may store haptic pattern data generated in advance by the haptic pattern data generator 320. For example, the haptic pattern data stored in the haptic pattern data storage 340 may include the first haptic pattern data generated based on the bit pattern of the content and the second haptic pattern data corresponding to the predetermined bit pattern for implementing the event effect.

The wireless data generator 330 may generate wireless data including haptic pattern data to be transmitted to a target haptic device and identification data of at least one target haptic device to receive the haptic pattern data. The identification data of the target haptic device may have a unique value of the corresponding haptic device. The wireless data generator 330 may receive the identification data from the haptic device.

In an example embodiment, the wireless data generator 330 may generate wireless data including first haptic pattern data that is generated in real time based on a content bit pattern included in content data received in real time through the receiver 310, and identification data of at least one target haptic device to receive the generated first haptic pattern data.

In another example embodiment, the wireless data generator 330 may generate wireless data including at least one of first haptic pattern data and second haptic pattern data generated before a point in time that content is provided and stored in the haptic pattern data storage 340 and identification data of a target haptic device. The wireless data generator 330 may generate the wireless data by selecting at least one of the stored haptic pattern data corresponding to at least one of received content data or event effect data, instead of generating haptic pattern data in real time.

In another example embodiment, the wireless data generator 330 may generate wireless data including a haptic pattern data indicator for selecting at least one of first haptic pattern data and second haptic pattern data stored in a target haptic device and identification data of the target haptic device. The control apparatus 300 may transmit a haptic pattern data indicator corresponding to received content data or event data to the target haptic device through the wireless data. The target haptic device may generate a haptic stimulus based on at least one of the haptic pattern data stored in the target haptic device corresponding to the received data indicator.

The wireless data generated by the wireless data generator 330 may further include operation control data associated with an operation of the target haptic device. For example, the operation control data may include data for adjusting a haptic stimulation cycle, a haptic stimulation intensity, and the like of the haptic device. In another example embodiment, the wireless data generator 330 may further include lighting pattern data for controlling a lighting effect of the haptic device.

The wireless data transmitter 350 may transmit the wireless data generated by the wireless data generator 330 through an antenna. The wireless data transmitter 350 may include a wireless communication chip for performing communication through wireless communication channels of different frequency bands, and transmit the wireless data to the haptic device through wireless communication channels of a plurality of frequency bands using a multi-channel antenna. The wireless data transmitter 350 may transmit the wireless data through wireless communication channels of a plurality of frequency bands, thereby ensuring a stability and a reliability of wireless data transmission.

The lighting pattern data generator 360 may determine a lighting pattern to be applied to the haptic device based on stage lighting data received through the receiver 310, and generate lighting pattern data based on the determined lighting pattern. For example, the lighting pattern data generator 360 may scale the received stage lighting data to be in a form applicable to the haptic device, determine a lighting pattern corresponding to a stage lighting change based on the scaled stage lighting data, and generate lighting pattern data based on the determined lighting pattern. The lighting pattern data generator 360 may generate lighting pattern data distinguished for each group of haptic devices. For example, the lighting pattern data generator 360 may generate lighting pattern data for applying different colors of lightings to haptic devices based on groups of haptic devices.

Figure 4A:
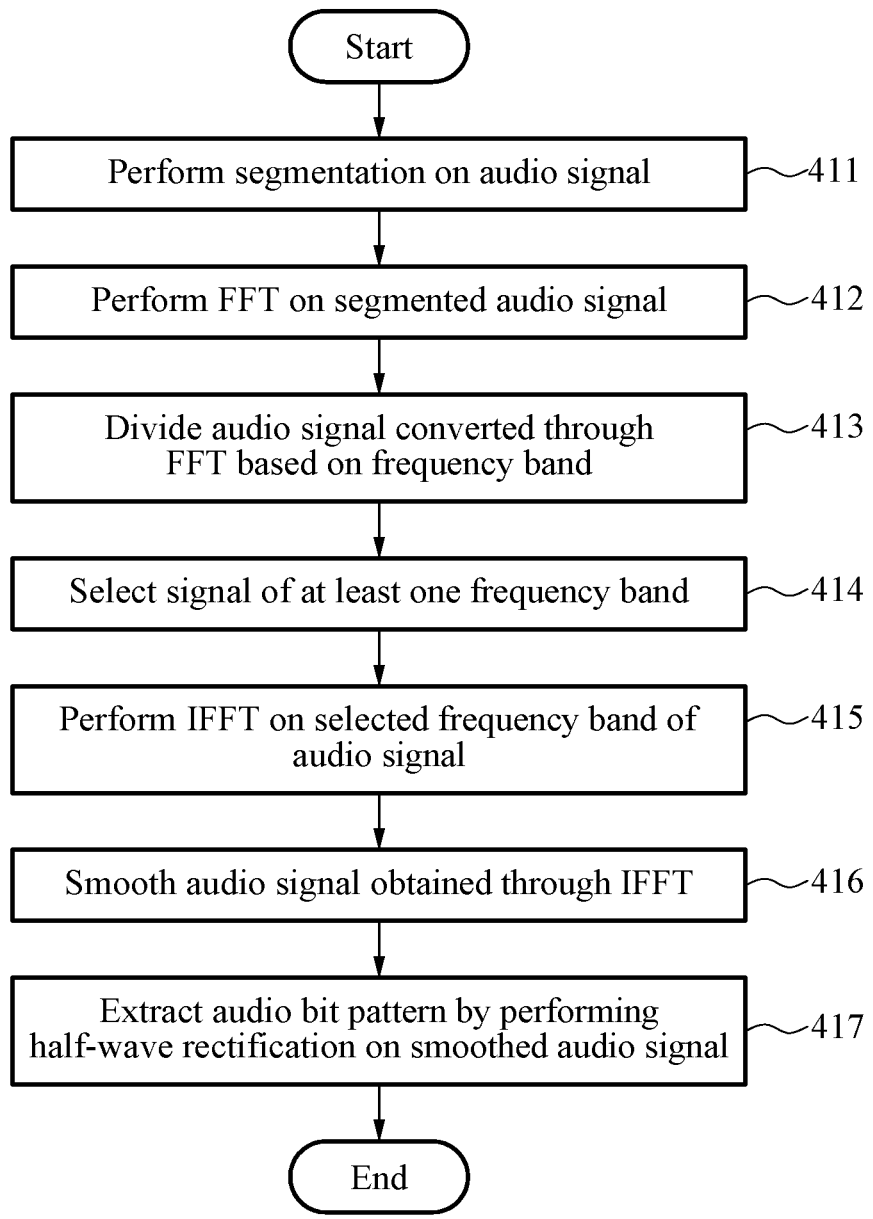
FIG. 4a is a flowchart illustrating operations of a method of extracting, by a haptic pattern data generator, an audio bit pattern from an audio signal of received to content data using a fast Fourier transform (FFT) according to an example embodiment.

FIG. 4a is a flowchart illustrating operations of a method of extracting, by a haptic pattern data generator, an audio bit pattern from an audio signal of received content data using fast Fourier transform (FFT) according to an example embodiment.

Referring to FIG. 4a, in operation 411, a haptic pattern data generator may perform segmentation on an input audio signal to perform the FFT on the audio signal. The segmentation may refer to dividing an audio signal into any number of data streams. For example, the haptic pattern data generator may segment an audio signal into 256 or 1024 data streams to smoothly perform the FFT on the audio signal. The number of data streams obtained through the segmentation is not limited to the example.

In operation 412, the haptic pattern data generator may convert the audio signal from a time domain into a frequency domain by performing the FFT on the segmented audio signal. In operation 413, the haptic pattern data generator may divide the audio signal converted into the frequency domain based on a frequency band. The haptic pattern data generator may divide the audio signal converted into the frequency domain, into audio signals of a plurality of frequency bands to acquire an audio signal of a frequency band including a desired audio bit pattern.

In operation 414, the haptic pattern data generator may select a signal of at least one frequency band including desired bit pattern information from the audio signals of the plurality of frequency bands. For example, the haptic pattern data generator may select a signal of at least one frequency band including bit pattern information to be extracted such as bit pattern information associated with a noise-free audio signal, bit pattern information associated with a specific musical instrument of an audio signal, and the like. In an example embodiment, when the haptic pattern data generator is to generate mono-type first haptic pattern data, the haptic pattern data generator may select a signal of a low frequency band including desired bit pattern information in operation 414.

In another example embodiment, when the haptic pattern data generator is to generate stereo-type first haptic pattern data, the haptic pattern data generator may select two channels corresponding to a signal of a high frequency band and a signal of a low frequency band including desired bit pattern information in operation 414.

In operation 415, the haptic pattern data generator may perform an inverse fast Fourier transformation (IFFT) on the selected frequency band of audio signal. The haptic pattern data generator may convert the audio signal of the selected frequency band from the frequency domain into a time domain through the IFFT.

In operation 416, the haptic pattern data generator may smooth the audio signal obtained through the IFFT. For example, in a process of smoothing the audio signal, the haptic pattern data generator may perform full-wave rectification on the audio signal converted into the time domain through the IFFT, reduce a distortion occurring due to the FFT and segmentation performed on the audio signal, and perform a convolution operation on the audio signal using a window function to smoothly correct a radically changing area. The window function may be, for example, a Hanning function, a Hamming function, and a Kaiser function, but is not limited thereto. Also, when the convolution operation is performed in the frequency domain, a speed of the convolution operation may be increased since a convolution operation in the time domain is the same as a multiplication operation in the frequency domain.

In operation 417, the haptic pattern data generator may extract an audio bit pattern by performing half-wave rectification on the smoothed audio signal.

Figure 4B:
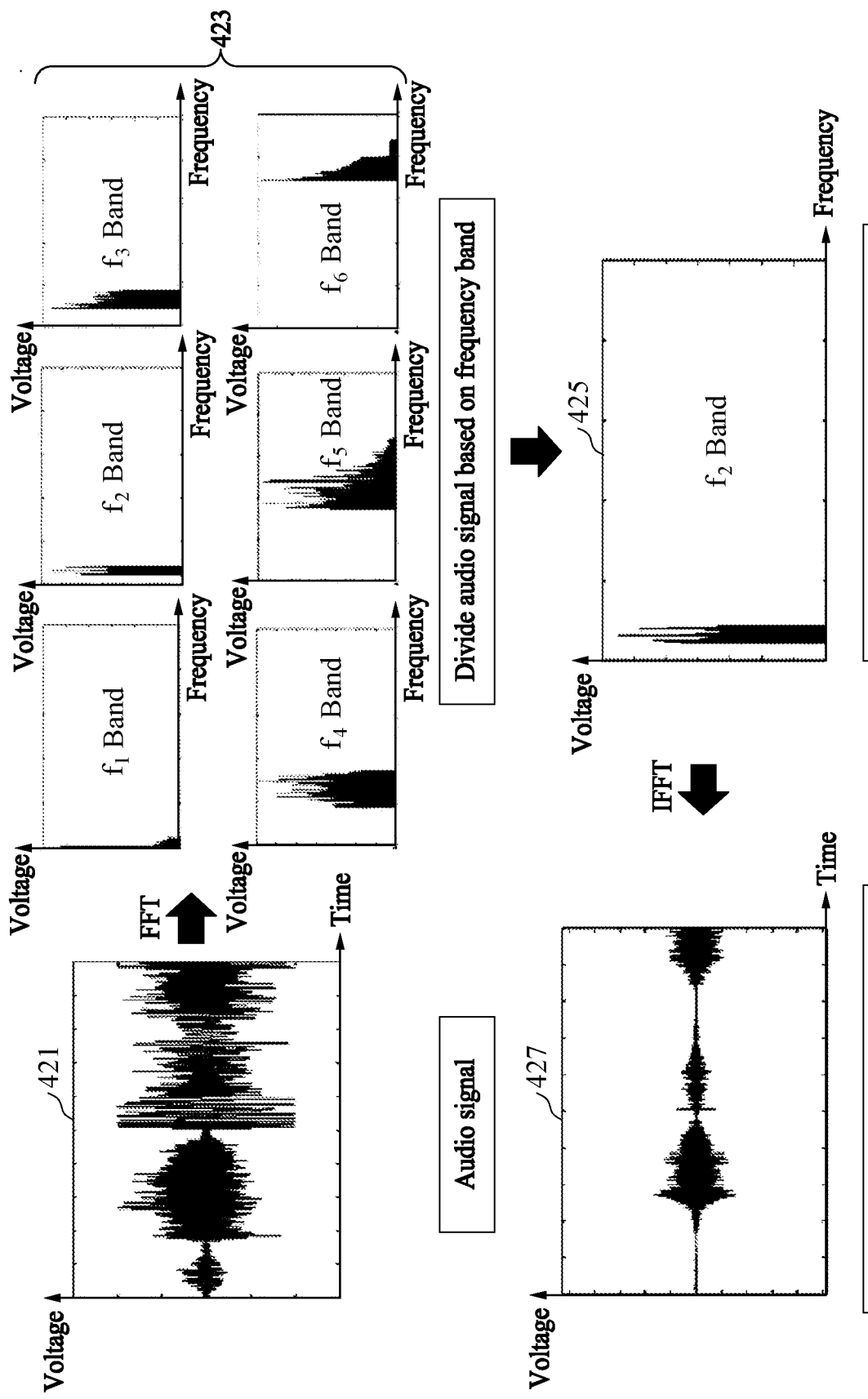
FIG. 4b is a diagram illustrating an example in which a haptic pattern data generator separates an audio signal of a frequency band including desired bit pattern information using FFT according to an example embodiment.

FIG. 4b is a diagram illustrating an example in which a haptic pattern data generator separates an audio signal of a frequency band including desired bit pattern information using FFT according to an example embodiment.

Referring to FIG. 4b, an audio signal 421 may be converted from a time domain into a frequency domain through an FFT, and then segmented into audio signals based on a frequency band. Signals 423 may be audio signals obtained through segmentation into six different frequency bands $f_1$, $f_2$, $f_3$, $f_4$, $f_5$, and $f_6$ obtained through the segmentation. A haptic pattern data generator may select an audio signal 425 of a frequency band, for example, the frequency band $f_2$ including desired bit pattern information from the audio signals of the plurality of frequency bands. The haptic pattern data generator may convert the selected audio signal 425 from the frequency domain into the time domain through an IFFT. The haptic pattern data generator may extract the desired bit pattern information by performing smoothing and half-wave rectification on an audio signal 427 converted into the time domain. The haptic pattern data generator may generate first haptic pattern data based on the extracted bit pattern information.

Figure 5A:
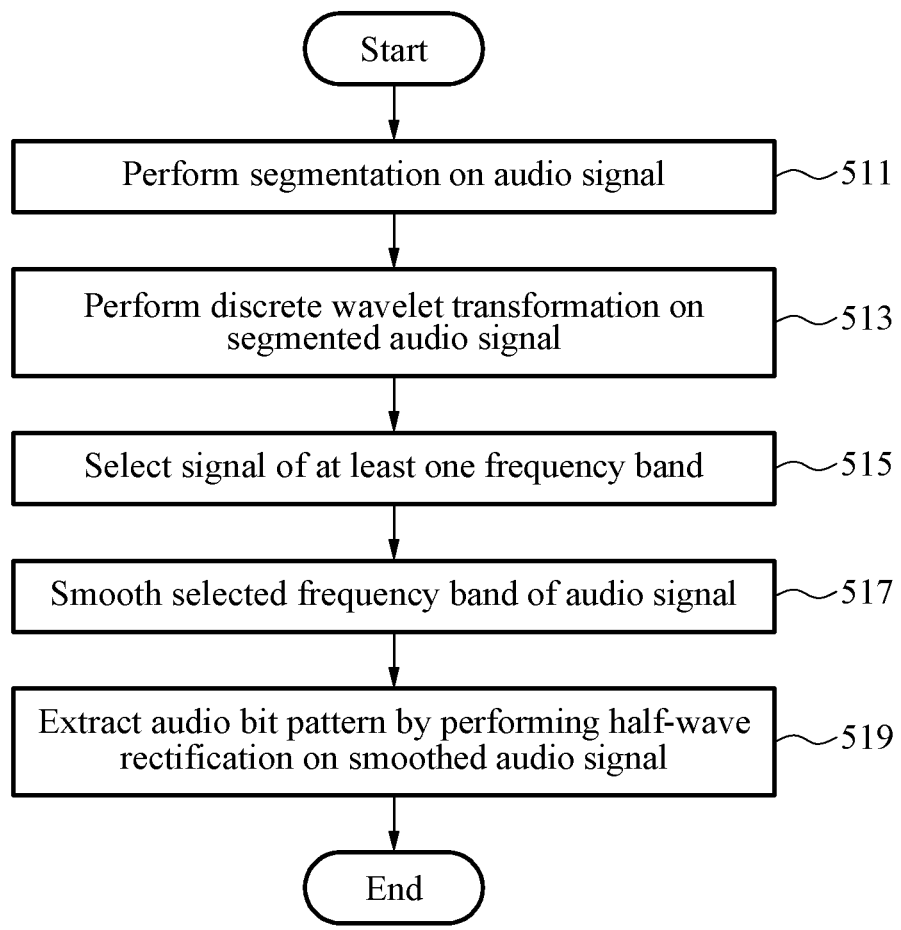
FIG. 5a is a flowchart illustrating operations of a method of extracting, by a haptic pattern data generator, an audio bit pattern from an audio signal using a discrete wavelet transform (DWT) according to another example embodiment.

FIG. 5a is a flowchart illustrating operations of a method of extracting, by a haptic pattern data generator, an audio bit pattern from an audio signal using discrete wavelet transform (DWT) according to another example embodiment.

Referring to FIG. 5a, in operation 511, a haptic pattern data generator may perform segmentation on an input audio signal to perform a discrete wavelet transformation on the input audio signal. For example, a first haptic pattern data determiner may segment an audio signal into 256 or 1024 data streams to smoothly perform the discrete wavelet transformation on the audio signal. However, the number of data streams is not limited to the example.

In operation 513, the haptic pattern data generator may separate the segmented audio signal for each frequency band through the discrete wavelet transformation. The haptic pattern data generator may separate the segmented audio signal for each frequency band through the discrete wavelet transformation to acquire an audio signal of a frequency band including a desired audio bit pattern. A method of separating an audio signal for each frequency band through the discrete wavelet transformation will be described in detail with reference to FIG. 5b.

In operation 515, the haptic pattern data generator may select a signal of at least one frequency band including desired bit pattern information from audio signals separated for each frequency band. For example, the haptic pattern data generator may select an audio signal of at least one frequency band including bit pattern information to be extracted such as bit pattern information associated with a noise-free audio signal, bit pattern information associated with a specific musical instrument of an audio signal, and the like.

In operation 517, the haptic pattern data generator may smooth the audio signal of the selected frequency band. For example, in a process of smoothing the audio signal, the haptic pattern data generator may perform full-wave rectification on the selected audio signal, reduce a distortion occurring in the audio signal, and perform a convolution operation on the audio signal using a window function to smoothly correct a radical area. The window function may be, for example, a Hanning function, a Hamming function, and a Kaiser function, but is not limited thereto.

In operation 519, the haptic pattern data generator may extract an audio bit pattern by performing half-wave rectification on the smoothed audio signal. The haptic pattern data generator may determine first haptic pattern data based on the extracted audio bit pattern.

Figure 5B:
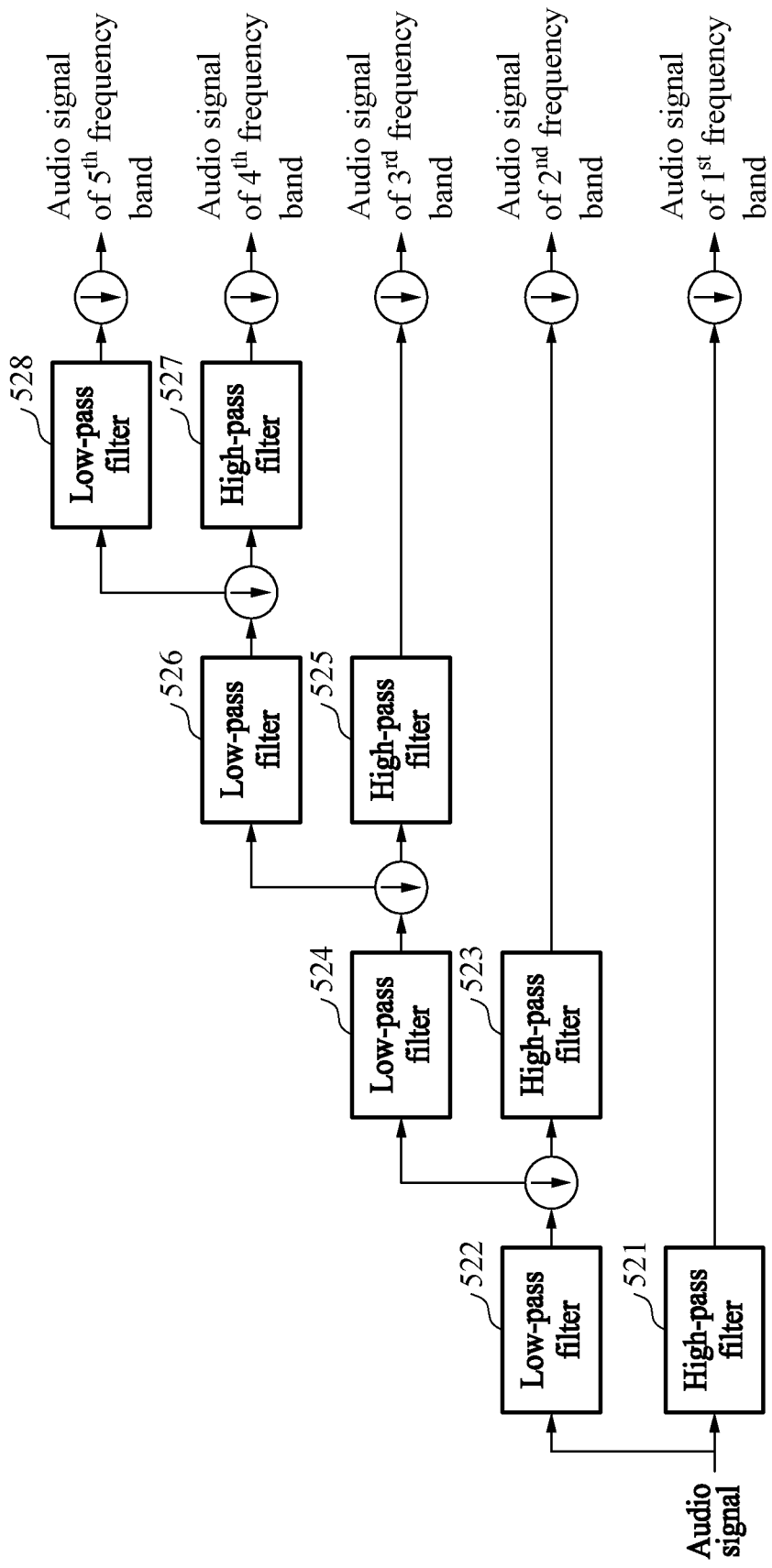
FIG. 5b is a diagram illustrating a process in which a haptic pattern data generator splits an audio signal for each frequency band through a discrete wavelet transformation according to another example embodiment.

FIG. 5b is a diagram illustrating a process in which a haptic pattern data generator splits an audio signal for each frequency band through a discrete wavelet transformation according to another example embodiment.

Referring to FIG. 5b, an audio signal may be filtered by a high-pass filter 521. The audio signal filtered by the high-pass filter 521 may be down-sampled and separated as an audio signal of a first frequency band. An audio signal filtered by a low-pass filter 522 may be down-sampled to be used as an input audio signal for separating an audio signal of a second frequency band. The input audio signal for separating the audio signal of the second frequency band may be filtered by a high-pass filter 523, and down-sampled to be separated as the audio signal of the second frequency band. The audio signal filtered by a low-pass filter 524 may be down-sampled to be used as an input audio signal for separating an audio signal of a third frequency band. In response to such filtering and down-sampling processes being performed by filters 525, 526, 527, and 528, the haptic pattern data generator may divide an audio signal for each frequency band in a time domain. For example, when an audio signal is to be divided into signals of n frequency bands, a filtering process may be performed 2n times. The haptic pattern data generator may select an audio signal of at least one frequency band including desired bit pattern information from signals of a plurality of frequency bands, and extract an audio bit pattern by performing the half-wave rectification on the selected audio signal.

Figure 6:
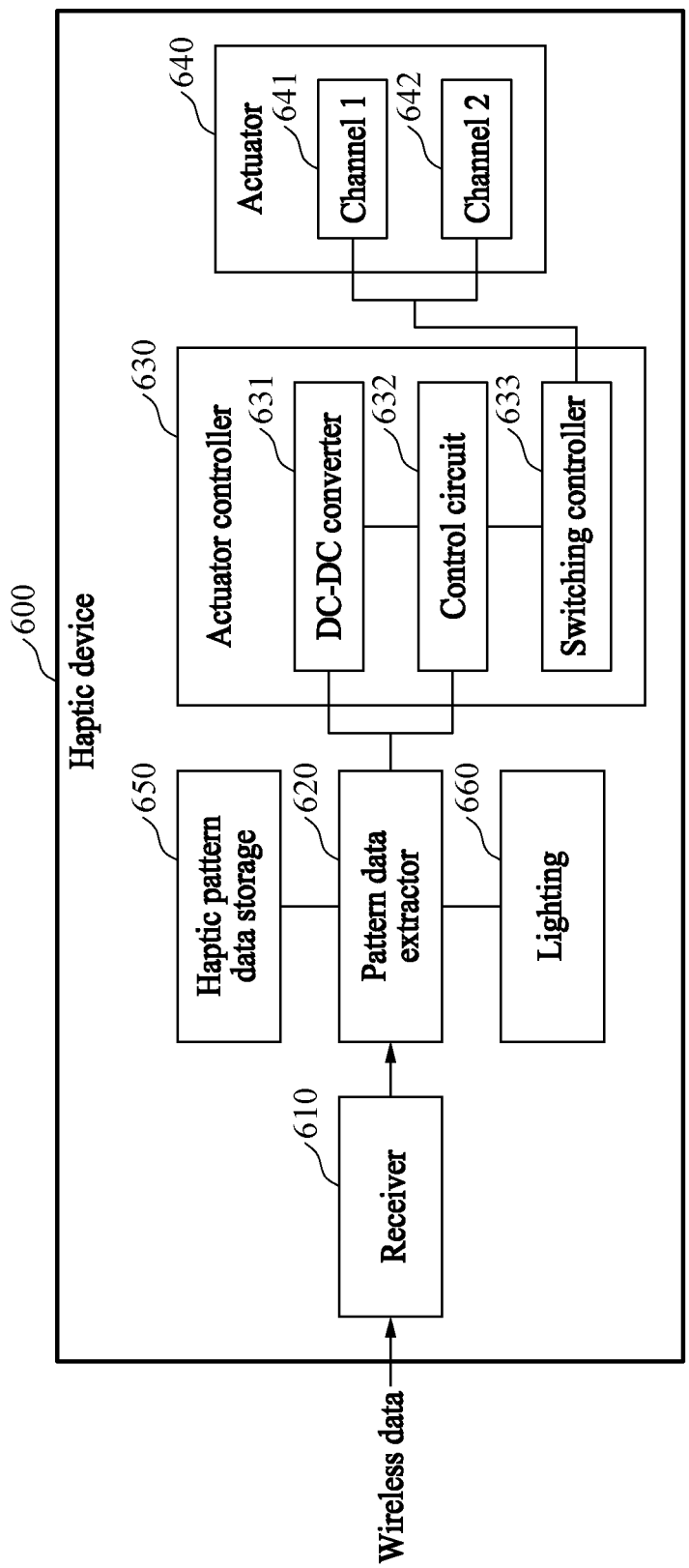

FIG. 6 is a diagram illustrating a configuration of a haptic device according to an example embodiment.

Hereinafter the term "pattern data" is used as a meaning including haptic pattern data and lighting pattern data. Referring to FIG. 6, a haptic device may include a receiver 610 that receives wireless data, a pattern data extractor 620 that extracts haptic pattern data, an actuator controller 630 that generates a control signal for controlling an actuator based on the extracted haptic pattern data, an actuator 640 that generates a haptic stimulus, a haptic pattern data storage 650 that stores haptic pattern data generated in advance, and a lighting 660 that generates a lighting effect based on lighting pattern data.

The receiver 610 may receive wireless data from the control apparatus. The haptic pattern data storage 650 may store at least one of first haptic pattern data generated in advance based on a bit pattern of content and second haptic pattern data generated in advance based on a predetermined bit pattern for implementing an event effect.

The pattern data extractor 620 may determine whether identification data of a target haptic device included in the wireless data matches identification data of the haptic device, and perform an operation of extracting pattern data only when it is determined that the identification data of the target haptic device matches the identification data of the haptic device. In an example embodiment, the pattern data extractor 620 may extract at least one of the first haptic pattern data and the second haptic pattern data from the wireless data received through the receiver 610.

In another example embodiment, the pattern data extractor 620 may extract at least one of first haptic pattern data and second haptic pattern data stored in the haptic pattern data storage 650 based on a haptic pattern indicator included in the wireless data received through the receiver 610. In another example embodiment, the pattern data extractor 620 may extract lighting pattern data included in the wireless data received through the receiver 610. The lighting 660 may generate a lighting effect based on the extracted lighting pattern data.

The actuator controller 630 may generate a control signal for controlling the actuator 640 based on the haptic pattern data extracted by the pattern data extractor 620. The actuator controller 630 may include a direct current (DC)-DC converter 630 that converts a voltage of a circuit to a higher voltage, a control circuit 632 that generates a current based on the haptic pattern data and a voltage applied from the DC-DC converter 630, and a switching controller 633 that generates a control signal in a form of current for controlling the actuator 640 by adjusting the current generated by the control circuit.

The actuator controller 630 may generate the current based on the haptic pattern data received from the pattern data extractor 620 and the voltage applied from the DC-DC converter 630 through the control circuit 632. The actuator controller 630 may generate an actuator control signal for controlling a haptic stimulus generated by the actuator 640 by adjusting the current generated by the control circuit 632 through the switching controller 633.

The actuator 640 may generate a haptic stimulus based on the actuator control signal. The actuator 640 may include two channels 641 and 642 for generating a stereo-type haptic stimulus. The actuator 640 may be, for example, an actuator including an eccentric rotating mass, a linear resonant actuator in which a mass attached to a spring is driven forwardly and backwardly, and an electromagnetic actuator, but is not limited thereto.

Figure 7:
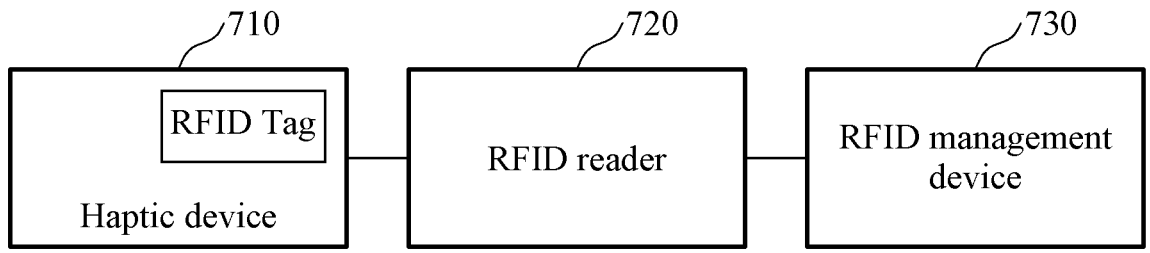
FIG. 7 is a diagram illustrating an example of a configuration for a theater entrance system using a radio-frequency identification (RFID) tag and a haptic device according to an example embodiment.

FIG. 7 is a diagram illustrating an example of a configuration for a theater entrance system using a radio-frequency identification (RFID) tag and a haptic device according to an example embodiment.

Referring to FIG. 7, a theater entrance system may include a haptic device 710, an RFID reader 720, and an RFID management device 730. The haptic device 710 may include an RFID tag 713 including identification data of a haptic device user. When entering a theater, the haptic device user may tag the haptic device 710 on the RFID reader 720, so that the identification data of the user of the haptic device 710 is to be recognized. The recognized identification data may be managed by the RFID management device 730. Based on the identification data of the user managed by the theater entrance system, the control apparatus may provide a lighting effect and a haptic stimulus appropriate for the haptic device 710.

Figure 8:
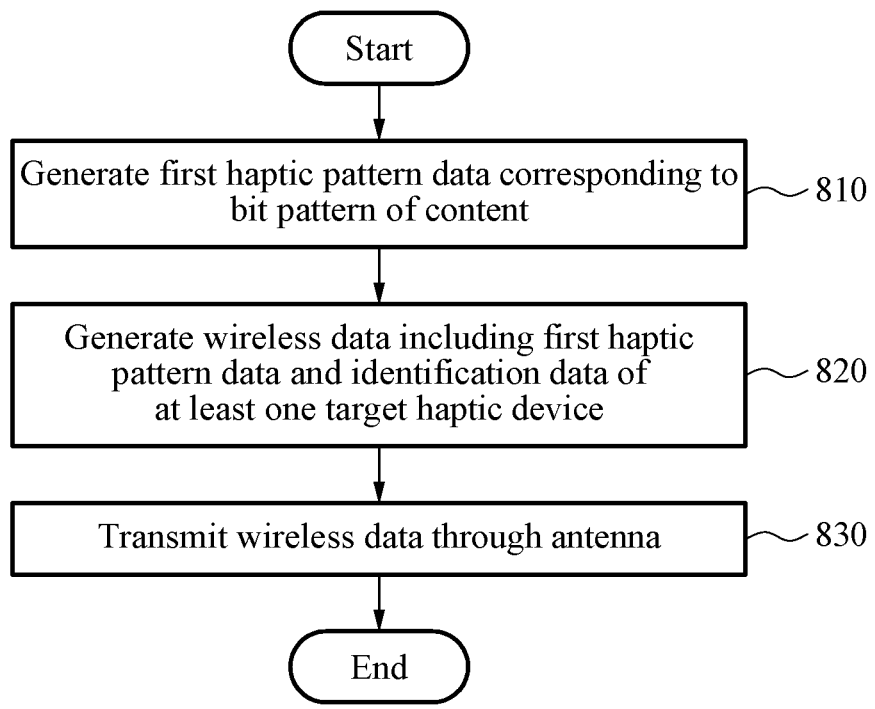
FIG. 8 is a flowchart illustrating operations of a wireless data providing method performed by a control apparatus to control an operation of a haptic device according to an example embodiment.

FIG. 8 is a flowchart illustrating operations of a wireless data providing method performed by a control apparatus to control an operation of a haptic device according to an example embodiment.

Referring to FIG. 8, in operation 810, a control apparatus may generate first haptic pattern data corresponding to a bit pattern of content. For example, the bit pattern of the content may be an audio bit pattern extracted from an audio signal included in content data. The control apparatus may generate the first haptic pattern data based on the extracted audio bit pattern.

In operation 820, the control apparatus may generate wireless data including the first haptic pattern data and identification data of at least one target haptic device to receive the first haptic pattern data.

In another example embodiment, the control apparatus may store, in a haptic pattern data storage, second haptic pattern data corresponding to a predetermined bit pattern for implementing an event effect before a point in time that content is provided. In a process of providing the content, when event effect data indicating an event effect provided on the content is received, the control apparatus may generate wireless data including the second haptic pattern data stored in the haptic pattern data storage and identification data of at least one target haptic device to receive the second haptic pattern data.

In operation 830, the control apparatus may transmit the generated wireless data through an antenna. The control apparatus may transmit the generated wireless data to each frequency channel using a multi-channel antenna. The control apparatus may transmit the wireless data at a plurality of frequencies, thereby achieving a safety and a reliability of wireless data transmission.

Figure 9:
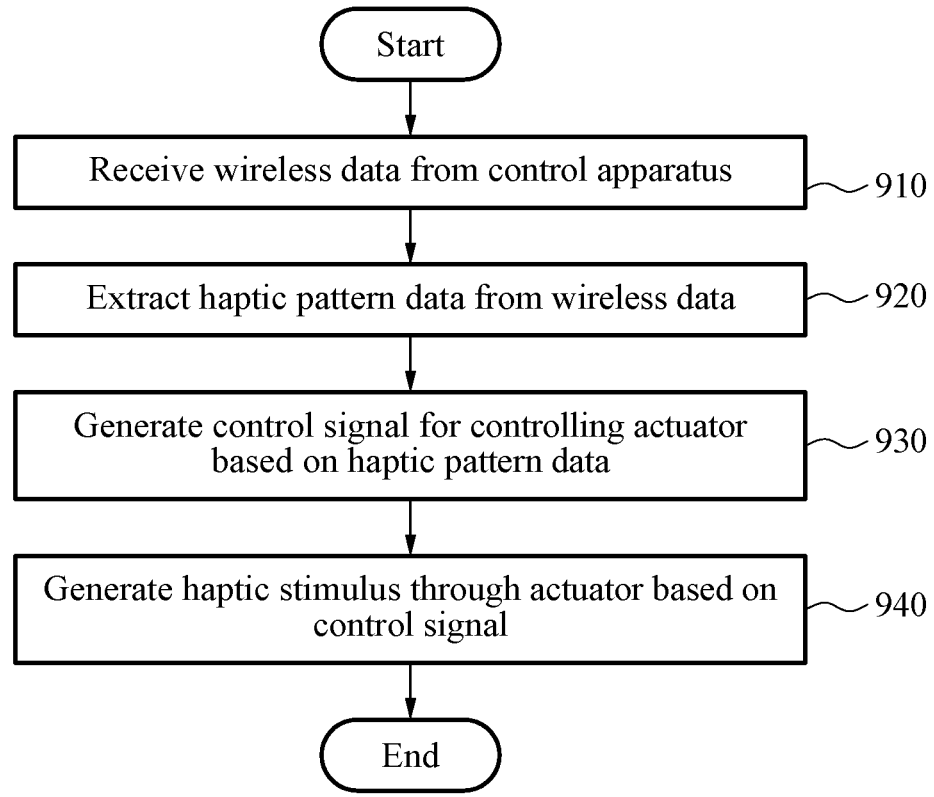
FIG. 9 is a flowchart illustrating operations of a haptic stimulus generating method performed by a haptic device according to an example embodiment.

FIG. 9 is a flowchart illustrating operations of a haptic stimulus generating method performed by a haptic device according to an example embodiment.

Referring to FIG. 9, in operation 910, a haptic device may receive wireless data from a control apparatus. In operation 920, the haptic device may extract haptic pattern data from the received wireless data. For example, the haptic pattern data may include first haptic pattern data corresponding to a bit pattern of content and second haptic pattern data corresponding to a predetermined bit pattern for implementing an event effect.

In operation 930, the haptic device may generate a control signal for controlling an actuator based on the extracted haptic pattern data. The haptic device may generate a control signal in a form of current through a DC-DC converter, a control circuit, and a switching controller. In operation 940, the haptic device may generate a haptic stimulus through the actuator based on the generated control signal.

The components described in the exemplary embodiments of the present invention may be achieved by hardware components including at least one DSP (Digital Signal Processor), a processor, a controller, an ASIC (Application Specific Integrated Circuit), a programmable logic element such as an FPGA (Field Programmable Gate Array), other electronic devices, and combinations thereof. At least some of the functions or the processes described in the exemplary embodiments of the present invention may be achieved by software, and the software may be recorded on a recording medium. The components, the functions, and the processes described in the exemplary embodiments of the present invention may be achieved by a combination of hardware and software.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

The invention claimed is:

1. A control apparatus for controlling an operation of a haptic device, the apparatus comprising:
   a haptic pattern data generator configured to generate first haptic pattern data corresponding to a bit pattern of content;
   a wireless data generator configured to generate wireless data including the first haptic pattern data and identification data of at least one target haptic device to receive the first haptic pattern data; and
   a wireless data transmitter configured to transmit the generated wireless data through an antenna.

2. The control apparatus of claim 1, further comprising:
   a haptic pattern data storage configured to store at least one of first haptic pattern data previously generated based on the bit pattern of the content and a second haptic pattern data previously generated based on a predetermined bit pattern for implementing an event effect.

3. The control apparatus of claim 2, wherein the wireless data generator is configured to generate wireless data including the second haptic pattern data and identification data of at least one haptic device to receive the second haptic pattern data.

4. The control apparatus of claim 1, wherein the wireless data generator is configured to generate wireless data including a haptic pattern data indicator for selecting at least one haptic pattern data from first haptic pattern data and second haptic pattern data stored in the haptic device.

5. The control apparatus of claim 1, wherein the wireless data further includes operation control data associated with an operation of the at least one haptic device.

6. The control apparatus of claim 1, wherein the wireless data transmitter is configured to transmit the wireless data to each frequency channel using a multi-channel antenna.

7. The control apparatus of claim 1, wherein the haptic pattern data generator is configured to generate first haptic pattern data distinguished for each group of haptic devices.

8. The control apparatus of claim 1, further comprising: a lighting pattern data generator configured to generate lighting pattern data for the at least one haptic device, wherein the wireless data further includes the lighting pattern data.

9. The control apparatus of claim 8, wherein the lighting pattern data generator is configured to determine a lighting pattern to be applied to the at least one haptic device based on stage lighting data and generate the lighting pattern data based on the determined lighting pattern.

10. A haptic device comprising:
    a wireless data receiver configured to receive wireless data from a control apparatus;
    a pattern data extractor configured to extract haptic pattern data from the wireless data;
    an actuator configured to generate a haptic stimulus; and
    an actuator controller configured to generate a control signal for controlling the actuator based on the extracted haptic pattern data,
    wherein the haptic pattern data includes at least one of first haptic pattern data corresponding to a bit pattern of content and second haptic pattern data corresponding to a predetermined bit pattern for implementing an event effect.

11. A haptic device comprising:
    a wireless data receiver configured to receive wireless data from a control apparatus;
    a pattern data extractor configured to extract haptic pattern data from the wireless data;
    an actuator configured to generate a haptic stimulus;
    an actuator controller configured to generate a control signal for controlling the actuator based on the extracted haptic pattern data; and
    a haptic pattern data storage configured to store at least one of first haptic pattern data previously generated based on a bit pattern of content and second haptic pattern data previously generated based on a predetermined bit pattern for implementing an event effect.

12. The haptic device of claim 11, wherein the wireless data comprises a haptic pattern data indicator, wherein the haptic pattern data extractor is configured to extract at least one of the first haptic pattern data and the second haptic pattern data stored in the haptic pattern data storage based on the haptic pattern data indicator.

13. A haptic device comprising:
    a wireless data receiver configured to receive wireless data from a control apparatus;
    a pattern data extractor configured to extract haptic pattern data from the wireless data;
    an actuator configured to generate a haptic stimulus;
    an actuator controller configured to generate a control signal for controlling the actuator based on the extracted haptic pattern data; and
    a lighting configured to generate a lighting effect based on lighting pattern data included in the wireless data.

14. A haptic device comprising:
    a wireless data receiver configured to receive wireless data from a control apparatus;
    a pattern data extractor configured to extract haptic pattern data from the wireless data;
    an actuator configured to generate a haptic stimulus; and
    an actuator controller configured to generate a control signal for controlling the actuator based on the extracted haptic pattern data,
    wherein the haptic pattern data extractor is configured to determine whether identification data of a target haptic device included in the wireless data matches identification data of the haptic device, and determine whether to extract the haptic pattern data based on a result of the determining.

15. A haptic stimulus generating method performed by a haptic device, the method comprising:
    receiving wireless data from a control apparatus;
    extracting haptic pattern data from the wireless data;
    generating a control signal for controlling the actuator based on the extracted haptic pattern data; and
    generating a haptic stimulus using the actuator based on the control signal,
    wherein the haptic pattern data includes at least one of first haptic pattern data corresponding to a bit pattern of content and second haptic pattern data corresponding to a predetermined bit pattern for implementing an event effect.

16. A haptic stimulus generating method performed by a haptic device, the method comprising:
    receiving wireless data from a control apparatus;
    extracting haptic pattern data from the wireless data;
    generating a control signal for controlling the actuator based on the extracted haptic pattern data; and
    generating a haptic stimulus using the actuator based on the control signal, wherein the control apparatus generates a first haptic pattern data corresponding to a bit pattern of content, generates the wireless data including the first haptic pattern data and identification data of at least one target haptic device to receive the first haptic pattern data, and transmits the generated wireless data through an antenna.

17. The haptic stimulus generating method of claim 16, wherein the control apparatus stores, in a haptic pattern data storage, second haptic pattern data corresponding to a predetermined bit pattern for implementing an event effect, and generates wireless data including the second haptic pattern data and identification data of at least one target haptic device to receive the second haptic pattern data.

18. A haptic stimulus generating method performed by a haptic device, the method comprising:
   receiving wireless data from a control apparatus;
   extracting haptic pattern data from the wireless data;
   generating a control signal for controlling the actuator based on the extracted haptic pattern data; and
   generating a haptic stimulus using the actuator based on the control signal,
   wherein the wireless data is transmitted to each frequency channel using a multi-channel antenna.

* * * * *